United States Patent [19]

Lurois

[11] Patent Number: 5,128,089
[45] Date of Patent: Jul. 7, 1992

[54] METHOD OF MOLDING A TIRE

[75] Inventor: Patrick Lurois, Cebazat, France

[73] Assignee: Compagnie Generale des Etablissements Michelin - Michelin & Cie, Clermont-Ferrand Cedex, France

[21] Appl. No.: 540,358

[22] Filed: Jun. 19, 1990

[30] Foreign Application Priority Data

Jun. 30, 1989 [FR] France .................. 89 09071

[51] Int. Cl.⁵ .................. B29C 43/04; B29C 30/68
[52] U.S. Cl. .................. 264/326; 152/209 A; 152/209 D; 425/32
[58] Field of Search .................. 264/326, 294, 315; 425/28.1, 25, 47, 54, 32, 37; 152/209 D, 209 R, DIG. 3, 209 A

[56] References Cited

U.S. PATENT DOCUMENTS 4,598,747 7/1986 Fletchner .................. 425/28.1

4,794,965 1/1989 Lagnier .................. 152/DIG. 3

FOREIGN PATENT DOCUMENTS

| 62-242508 | 10/1987 | Japan | 264/326 |
| 63-43803 | 2/1988 | Japan | 152/209 D |
| 64-4501 | 1/1989 | Japan | 152/209 R |
| 2100200 | 12/1982 | United Kingdom | 152/209 D |

*Primary Examiner*—Jan H. Silbaugh
*Assistant Examiner*—Mathieu Vargot
*Attorney, Agent, or Firm*—Brumbaugh, Graves, Donohue & Raymond

[57] ABSTRACT

In order to assure the geometric uniformity of a tire molded with a segment mold when the sculpturing of said tire includes blocks 11 surrounded by recesses formed by grooves 15 and incisions 16, the said grooves 15 are thinned at the level of the joint planes 550 between segments. Furthermore, wear indicators 17 are arranged at the level of the joint planes 550 between segments.

4 Claims, 5 Drawing Sheets

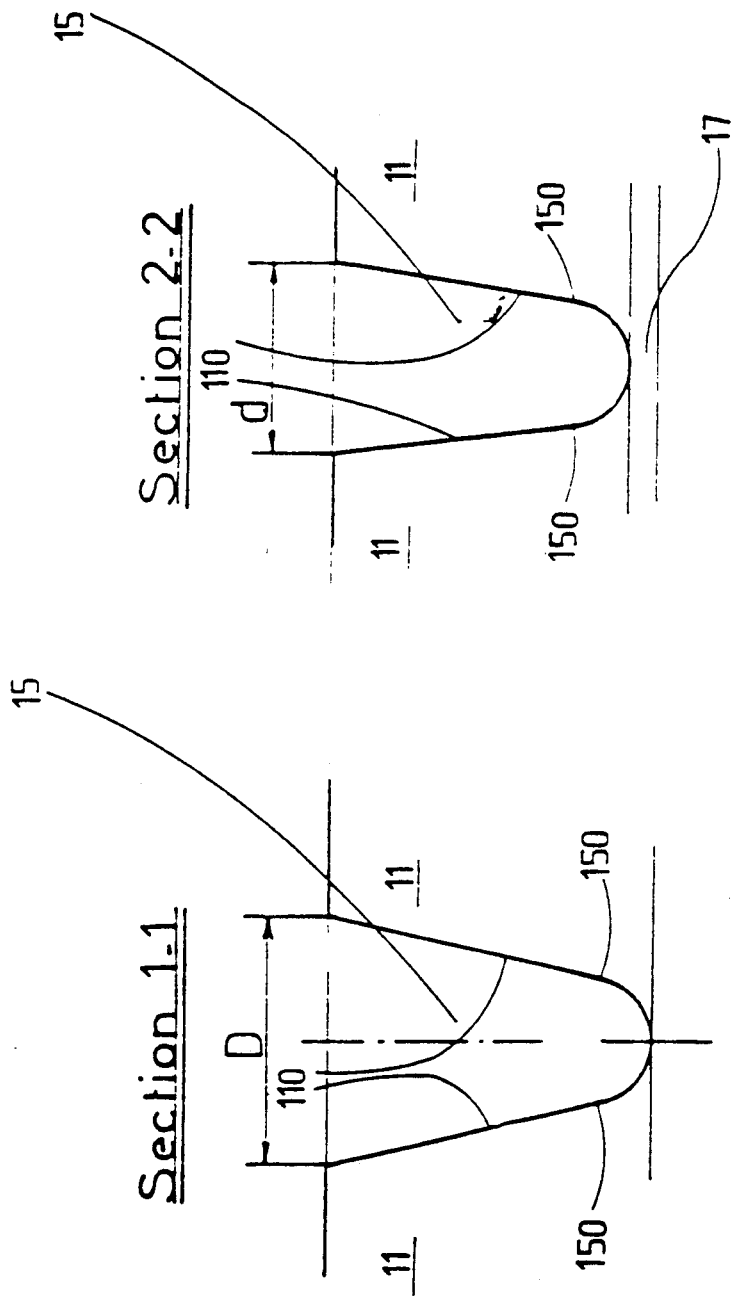

METHOD OF MOLDING A TIRE

BACKGROUND OF THE INVENTION

The present invention relates to the molding of tires, and in particular, radial tires for passenger cars or so-called "heavy vehicles", such as trucks or buses. It also concerns the molding of treads used for recapping, and in particular, it concerns the sculpture of the treads of such tires.

In order to effect the molding and vulcanizing of these tires, it is well known to use molds comprising two side parts which mold the side walls and an annular ring of segments arranged between the side parts to mold of the tread. By way of example, U.S. Pat. Nos. 3,847,520 and 3,779,677 describe such molds.

Based on the finding that certain tires for heavy vehicles, particularly when used on buses, caused vibrations and noise in frequencies ranging from 30 Hz to 150 Hz, it has been possible to establish that the cause of these vibrations is to be imputed to the molding of the tires.

The object of the present invention is, therefore, to provide a new concept for the construction of the molds in order to do away with the defects of lack of geometrical uniformity, irregularity and excess thickness which cause annoyance from the standpoint of comfort in the vehicle.

In accordance with the invention, the method of molding a tire having a tread provided with a sculpture, said sculpture having blocks of rubber surrounded by recesses formed at least in part by grooves, each of said blocks having a theoretical volume of rubber, said tread being molded by a segment mold, each segment being limited in circumferential direction by transverse faces, said segments being provided with elements in relief disposed in accordance with the arrangement desired in order to impress the recesses defining the sculpture of said tread, said elements in relief defining on the segments recessed zones the volume of which corresponds to said theoretical volume, some of such recessed zones being distributed over two adjacent segments, the method being characterized by the fact that those of said recessed zones which are distributed over two adjacent segments have a volume greater than the said theoretical volume of the corresponding block.

The invention also relates to segment molds designed in accordance with the conditions set forth. It can be applied both to molds, the transverse faces of the segments of which are radial, as is the most frequent case, and to molds the transverse faces of which are parallel to a sculpture motif, as well as to molds comprising furthermore a circumferential median separation defining two axially adjacent rings. Moreover, it extends to the tires produced by the method described.

In order to simplify the description of the invention, there will be described below its application for a given sculpture for heavy vehicle tires obtained by molding by means of a segment mold, the transverse faces of said segments being radial.

During the closing phase mold in a vulcanization press, it is desirable that the closing of the mold takes place before the commencement of the molding of the sculpture. In fact, most of the tread sculptures have furrows, whether linear or not. In order to assure the molding of these furrows, there are elements in relief which protrude radially towards the inside on the inner surface of the segments since the latter comprise what is commonly referred to as the negative of the sculpture to be molded. By the formation "in segments" of the molding ring of the tread, these elements in relief are interrupted at the level of the transverse faces of the segments, also referred to as "joint planes of the segments." Therefore, if one starts the molding before the segments are all together, that is to say, before the complete closing of the mold, there is the danger of imprisoning rubber between the segments of the molds, at least at the level of the elements in relief.

If, in order to avoid this problem, the tire is built in such a manner that in raw state the outer surface of the tread is located at a radial level just lower than the elements in relief of the mold when the latter is closed, then the additional shaping made necessary in order for the tire to reach its final dimensions causes sliding of the reinforcement cords (carcass plies and crown plies) and changes in angles which these cords form with respect to each other. Furthermore, this additional shaping can be made impossible in the case of filiform reinforcements arranged below the tread at 0° with respect to a plane perpendicular to the axis of rotation.

Therefore, it is often the practice to dimension a tire in raw state in such a manner that the start of the penetration of the elements in relief of the segments of the mold into the rubber of the tread takes place before the mold is completely closed.

This gives rise to the appearance of a defect which had never been observed before in the case of sculptures having blocks of rubber surrounded on all sides by recesses. In the following description, these recesses will be called "grooves" if their width is greater than 2 mm and "incisions" if not. Frequently, these incisions are closed when the tire is inflated; they are closed at least in the area of contact with the road, while the grooves are intended, in particular, to remove water in rainy weather and must therefore remain open.

Whatever the type of recess, the molding problem arises when the sculpture comprises blocks surrounded on all sides by recesses. At the level of the joint planes between the segments, the recesses corresponding to the blocks of rubber are generally distributed over the two adjacent segments. This limits the appearance of the burrs referred to above and also simplifies the formation of the segments and the control of the movements of the vulcanization press.

It has been found that the vibrations complained of corresponded to a defect in circularity of the tire of harmonic H6 to H16, corresponding to the number of segments of the mold.

It has been found that a defect in geometrical regularity can even appear when the sculpture comprises blocks which are connected together by bridges of rubber, in particular when the sculpture comprises large circumferential furrows and transversely arranged incisions or grooves, without these incisions or grooves traversing the rib of rubber on both sides. Therefore, more generally, it is not necessary for the blocks to be surrounded on all sides by recesses; as soon as the elements of the mold assuring the molding of the sculpture constitute an impediment to the movements of still unvulcanized rubber in circumferential direction by complete blocking or at least by causing a loss in head sufficiently great to limit the flow, and therefore the mass transfer, geometrical defects appear having harmful results in operation.

As a further example, on certain tires for passenger cars, different amounts of wear have been found at the places of the tread corresponding to the joints between segments as compared with the places of the tread corresponding to the centers of the segments.

DESCRIPTION OF THE DRAWINGS

The accompanying figures make it possible to understand the invention, providing a non-limitative illustration thereof.

FIG. 5 is a section along the line 1—1 of FIG. 4;

FIG. 6 is a section along the line 2-2 of FIG. 4;

DESCRIPTION OF PREFERRED EMBODIMENTS

Figures 1, 2, 3:
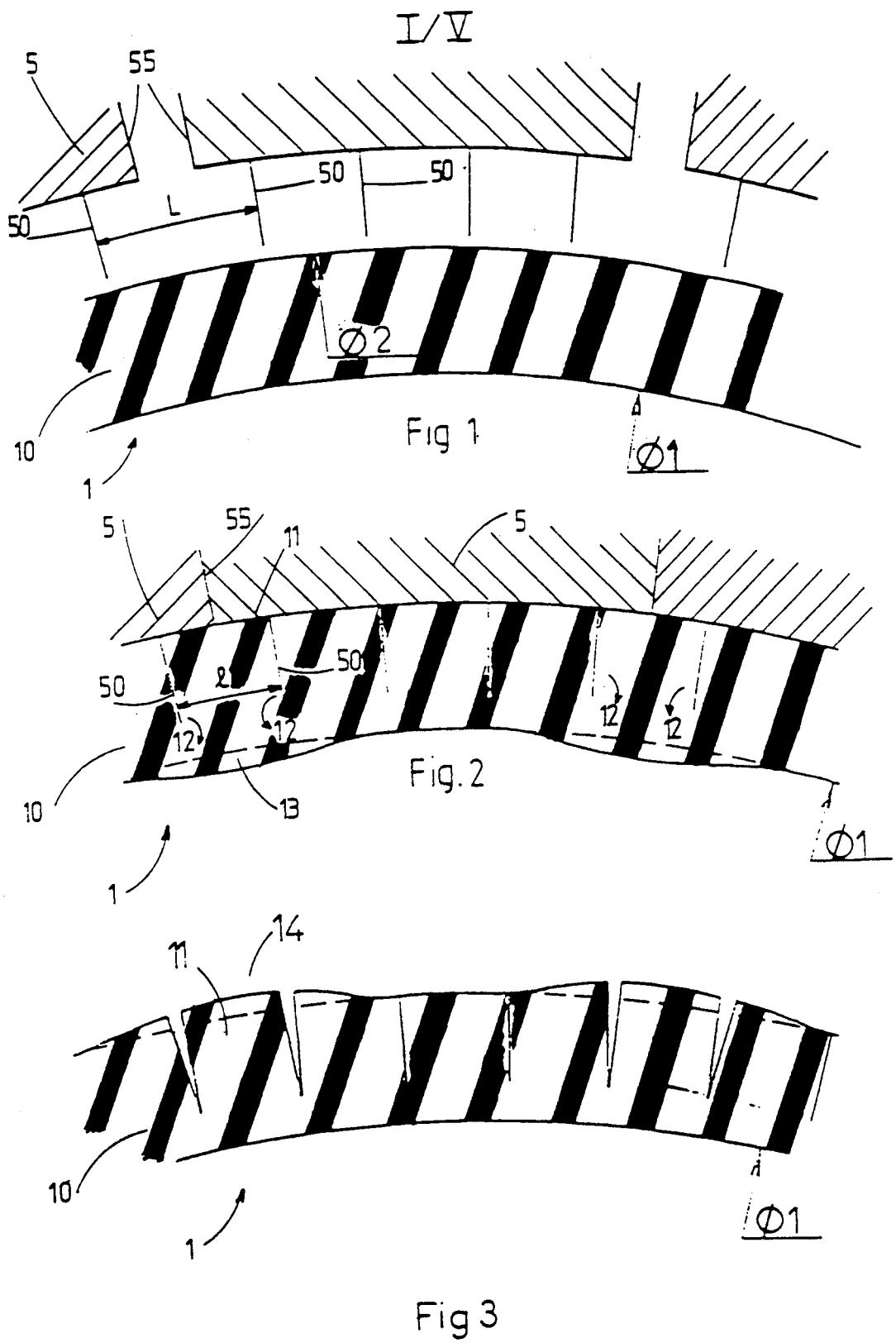
FIGS. 1 to 3 are sections taken perpendicular to the axis of rotation to diagrammatically show the problems inherent in the molding of the sculpture of the tread of the tire by mold segments.

FIGS. 1 to 3 diagrammatically indicate a tire 1 whose diameter $\phi_1$ corresponds substantially to the diameter of the belt and the diameter $\phi_2$ of which, measured on the surface of the tread 10 in raw state, corresponds approximately to the final outside diameter of the vulcanized tire.

There can also be noted the segments 5 of a mold bearing elements 50 in relief which assure the molding of recesses on the tread. The segments 5 are defined by radially oriented transverse faces 55, and the sculpture of the tread 14 comprises circumferential furrows molded by corresponding circumferential elements on the segments (not shown).

FIG. 1 shows that, when the elements 50 start to penetrate into the rubber of the tread 10, the segments 5 are still spaced from each other.

When the mold has transversely oriented elements 50 in relief, the elements 50 adjacent to the transverse faces 55 of the segments 5, since they penetrate into the rubber before the complete closing of the mold and while they are still spaced apart in the circumferential direction by a distance L greater than the distance 1 corresponding to the position of closing of the mold, have a tendency to imprison a volume of raw rubber which is greater than the theoretical volume of the corresponding block 11 on the tread 10.

Upon the manufacture of the tire in the raw state, the unvulcanized rubber is distributed uniformly over the tread in circumferential direction. The total volume of rubber of course depends on the total volume of all the blocks of rubber constituting the sculpture of the tread when the tire is molded and vulcanized. For each block, the theoretical volume of rubber is determined by the precise shape which the designer of the sculpture wishes to impart to a block. For example, the theoretical volume of the block 11 depends on the depth of the surface of the block 11, of the depth of the sculpture, of the shape of the taper for the adjacent grooves, and on the considerations imposed by the variable pitch technique. Now the term "theoretical volume" as used herein means the volume of the ideal block in question, located at the level of the joint between segments 5, and not to the volume taken for a block located elsewhere in the sculpture.

Thus, as the volume of rubber is greater than what it would be necessary to mold, the excess volume causes a deformation of the tire radially towards the inside by a movement of rubber indicated diagrammatically by the arrows 12, in particular, a displacement 13 of the reinforcement structure (belt) of the crown radially towards the inside, which is permitted by the flexible molding membrane of the inner cavity of the tire, while any radially outward deformation is prevented by the rigidity of the mold.

After mounting and inflation of a tire which has been vulcanized in this manner, it is the reinforcement belt which will impose the development and effective final shape of the tire. Therefore, under the effect of the inflation pressure, which is high for the tires in question, the belt assumes a perfectly circular shape, as seen in section through a plane perpendicular to the axis of rotation of the tire (FIG. 3). Therefore, the excess volume of all the blocks of rubber at the level of the joint planes between segments causes a humping 14 and therefore a defect in circularity at the level of the surface of the tread. Upon travel, this causes clearly perceptible vibrations, even in the case of defects of the order of 0.2 mm in excess on the radius for a total radius of 500 mm for the example in question, namely in the case of tires for heavy vehicles.

Figure 4:
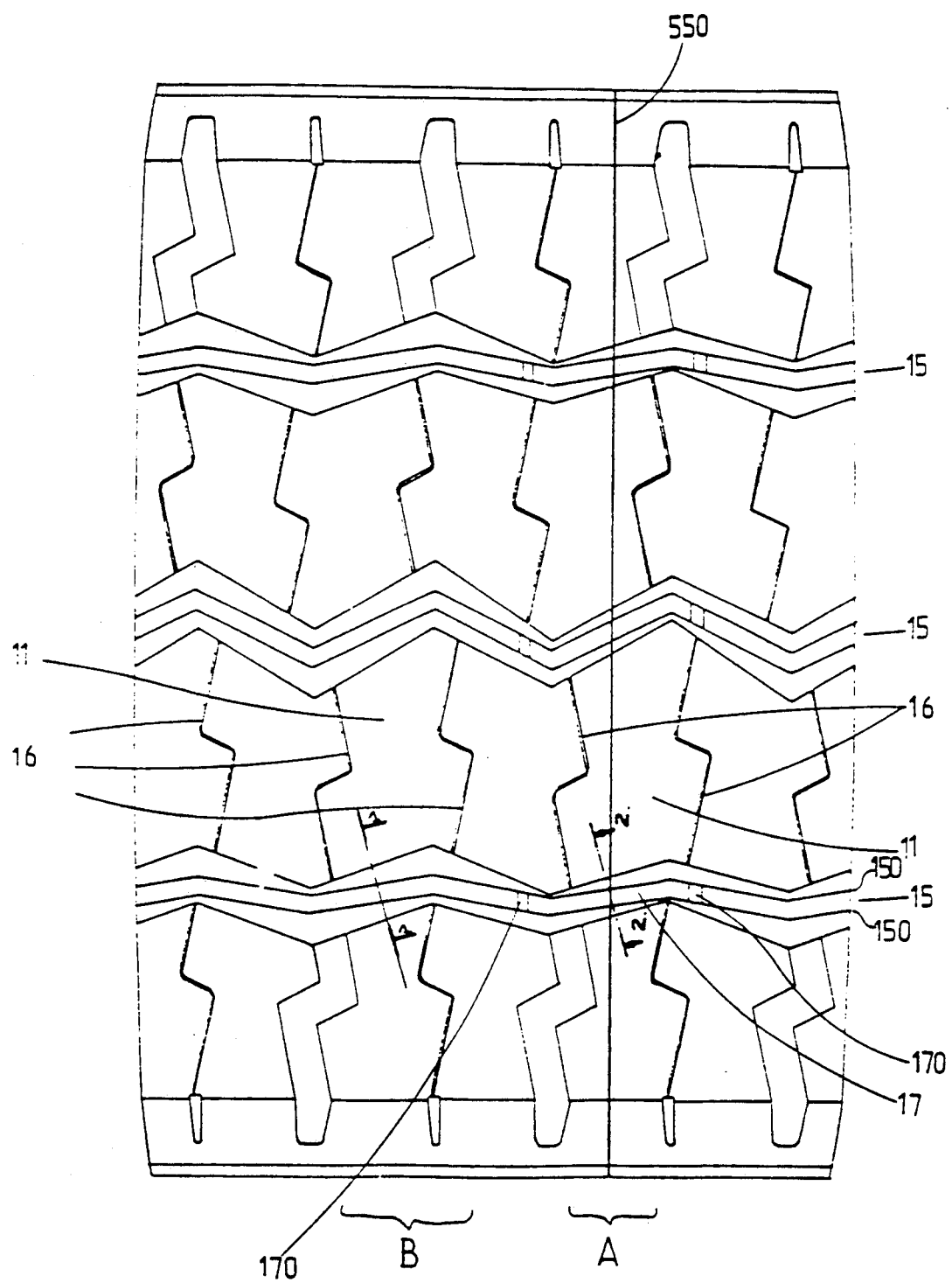
FIG. 4 is a view of the outer surface of the tire tread made according to the present invention and illustrates a sculpture at the level with the joint plane between mold segments.

In order to avoid the appearance of these bosses in the sculptures shown in FIG. 4 and following figures, it is proposed, in accordance with the invention, to move the excess volume transversely instead of radially, for instance by thinning the elements of the mold in relief bordering the recessed zone distributed over two adjacent segments. This has the result of locally decreasing the cutting rate of the sculpture and increasing the surface of the block of rubber as compared with its theoretical surface as it results from the design of the sculpture, in particular from considerations dictating the design in variable pitch. One can also decrease the height of the said elements in relief, for instance by judicious placement of the wear indicators.

FIGS. 4, 5 and 6 show a tire sculpture consisting of three circumferentially oriented grooves 15 and comprising numerous transversely arranged incisions 16. In the case under consideration, the blocks 11 thus defined are located uniformly in identical manner in the sculpture, which is therefore referred to as being of "constant pitch." The theoretical volume of the block 11 in the zone A is identical to the theoretical volume of the block 11 in the zone B.

In FIGS. 4 to 8 it is seen that the thinning is concentrated on the elements in relief which mold the grooves, since there is not sufficient volume to modify the elements in relief molding the incisions. It is seen that the thinned grooves are circumferentially oriented. It has been found that good results are obtained when the ratio of the volume of the distributed recessed zones to the said theoretical volume is between 1.01 and 1.10, and preferably between 1.025 and 1.05.

The bottom of the groove 15 is formed by a rounding the lines 150 of which represent the encounter with the sides 110 of the blocks 11. The line 550 is the trace of the joint between segments 5 of the mold.

According to the invention there is provided, within the zone A, a molding volume for the corresponding blocks 11 which is greater than the theoretical volume. This is obtained by a thinning of the grooves, the width d of which in the zone A (FIG. 6) is less than the width D in the zone B, or, more generally, outside of the joints of the segments (FIG. 5). Furthermore, the wear indicators 17 are arranged in said zone A; they are therefore distributed over two adjacent segments, which makes it possible to use a part of the excess of volume of rubber in order to constitute them. The wear indicator 17 is formed, on the tread of the tire, by an excess thickness of rubber at the bottom of the grooves 15, limited by slightly inclined edges 170.

Figure 7:
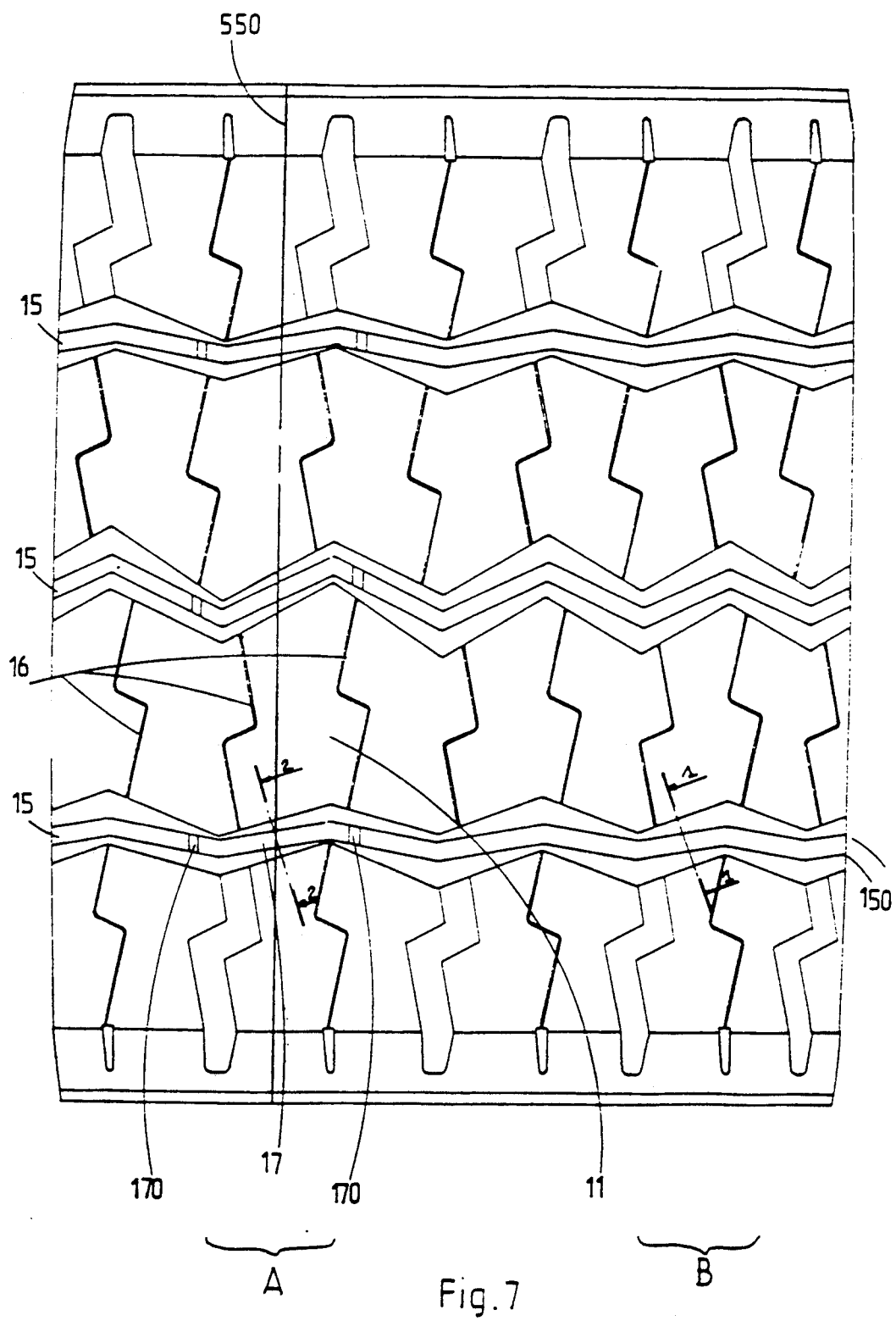
FIGS. 7 and 8 are views similar to FIG. 4 illustrating different tread sculptures made according to the present invention.

The embodiment shown in FIG. 7 differs from that shown in FIGS. 5 to 6 only by the variable character of the pitch of the sculpture. Upon comparing the zones A and B, there is noted a thinning of the same nature of the groove 15 at the place of the joint 550 between segments as well as the locating of the wear indicators 17 at the same place.

Figure 8:
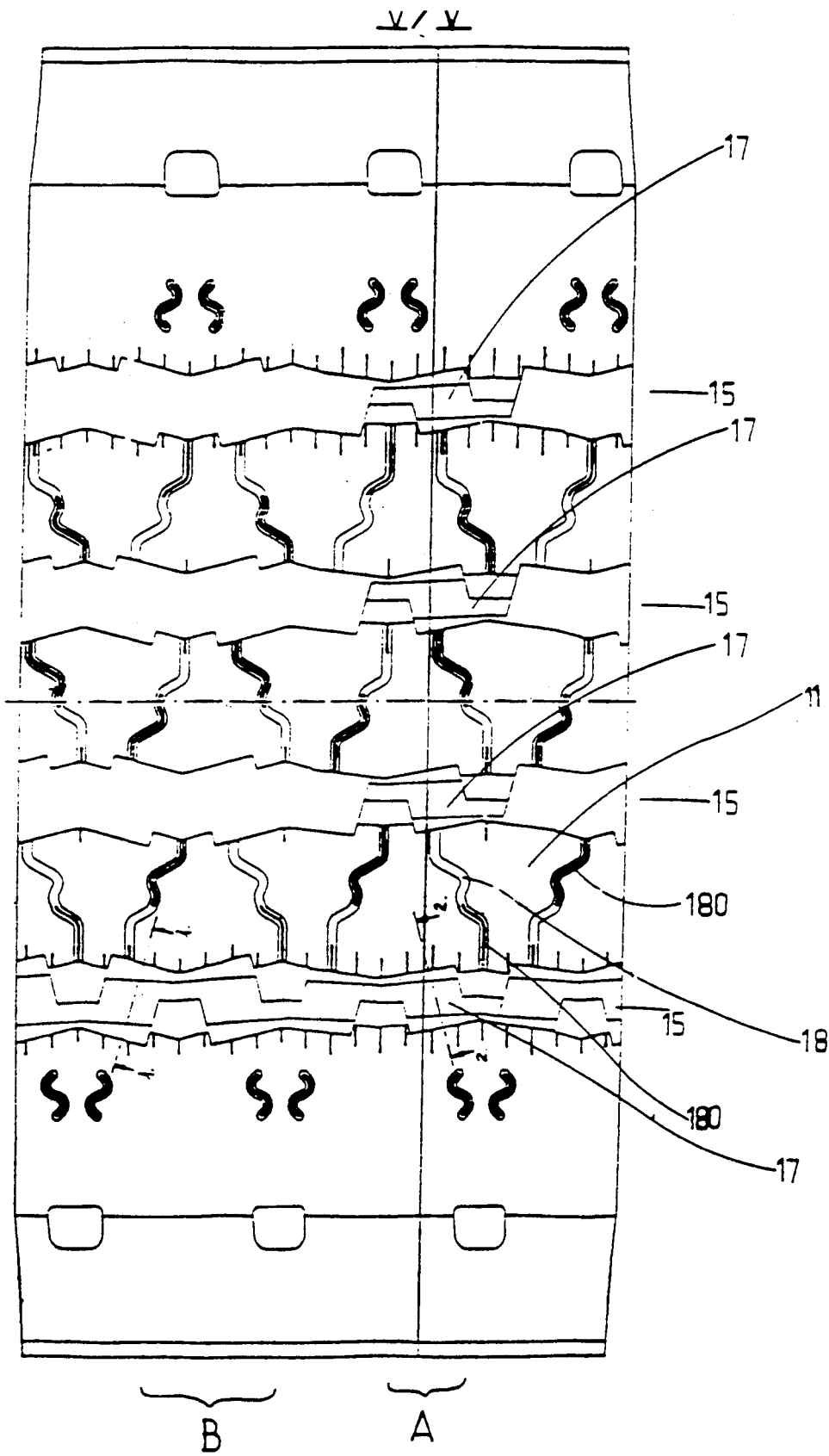

In FIG. 8 it is seen that the blocks 11 are defined transversely by small shallow grooves 18 which are extended radially part by incisions 180. The latter are developed only on one part (about 50% in the illustration) of the distance between two adjacent grooves 15. In order to prevent the appearance of defects in geometry, there is present here again a local thinning (zone A) of each groove 15, as well as the location of the wear indicators 17 in the same zone A.

I claim:

1. A method for molding a tire in a vulcanization press in which the tread is a sculpture which includes blocks surrounded by recesses, said blocks and recesses being formed by elements in relief and recessed zones on mold segments, the sculpture further including at least one recess which is a circumferential groove adjacent the blocks molded by recessed zones distributed over two adjacent mold segments, said method being intended to avoid the formation of humps on the blocks caused by the circumferential compression of the material to be molded in the recessed zones distributed over two adjacent mold segments, comprising introducing an uncured tire into the vulcanization press, moving a plurality of mold segments radially inwardly into molding engagement with the uncured tire to mold the tread sculpture, the recessed zones distributed over two adjacent mold segments having volumes greater than the volumes of recessed zones which cause humps in the tire, said greater volumes being obtained by increasing the transverse dimension of the said recessed zones by thinning the size of the adjacent circumferential groove, and distributing the uncured material throughout the recessed zones of greater volume to avoid formation of humps.

2. A method according to claim 1, in which said thinning is concentrated on the part of the elements in relief which mold the grooves.

3. A method according to claim 1, in which said thinning is concentrated on the part of the elements in relief which mold the grooves which are oriented approximately circumferentially.

4. A method according to claim 1, in which said greater volumes are obtained by arranging wear indicators in such a manner that they are distributed over two adjacent segments.

* * * * *

UNITED STATES PATENT AND TRADEMARK OFFICE
CERTIFICATE OF CORRECTION

PATENT NO. : 5,128,089
DATED     : July 7, 1992
INVENTOR(S) : Patrick Lurois

It is certified that error appears in the above-identified patent and that said Letters Patent is hereby corrected as shown below:

<u>Col. 1, line 60</u>, "phase mold" should read --phase of the mold--.

<u>Col. 4, line 59</u>, "a rounding" should read --a rounding of--;
      <u>line 60</u>, "of which" should read --which--.

<u>Col. 5, line 18</u>, "part" should read --in part--.

Signed and Sealed this

Nineteenth Day of October, 1993

Attest:

BRUCE LEHMAN

Attesting Officer  Commissioner of Patents and Trademarks